(12) United States Patent
Wang

(10) Patent No.: US 12,541,356 B2
(45) Date of Patent: Feb. 3, 2026

(54) FILE UPDATE METHOD AND APPARATUS, DEVICE AND STORAGE MEDIUM

(71) Applicants: BEIJING WODONG TIANJUN INFORMATION TECHNOLOGY CO., LTD., Beijing (CN); BEIJING JINGDONG CENTURY TRADING CO., LTD., Beijing (CN)

(72) Inventor: Kai Wang, Beijing (CN)

(73) Assignees: BEIJING WODONG TIANJUN INFORMATION TECHNOLOGY CO., LTD., Beijing (CN); BEIJING JINGDONG CENTURY TRADING CO., LTD., Beijing (CN)

( * ) Notice: Subject to any disclaimer, the term of this patent is extended or adjusted under 35 U.S.C. 154(b) by 274 days.

(21) Appl. No.: 18/250,554

(22) PCT Filed: Oct. 13, 2021

(86) PCT No.: PCT/CN2021/123546
§ 371 (c)(1),
(2) Date: Apr. 26, 2023

(87) PCT Pub. No.: WO2022/111097
PCT Pub. Date: Jun. 2, 2022

(65) Prior Publication Data
US 2023/0393840 A1    Dec. 7, 2023

(30) Foreign Application Priority Data
Nov. 26, 2020   (CN) .......................... 202011351980.1

(51) Int. Cl.
*G06F 8/65* (2018.01)
*G06F 11/3604* (2025.01)

(52) U.S. Cl.
CPC ............ *G06F 8/65* (2013.01); *G06F 11/3604* (2013.01)

(58) Field of Classification Search
CPC .............................. G06F 8/65; G06F 11/3604
See application file for complete search history.

(56) References Cited

U.S. PATENT DOCUMENTS

| | | | | |
|---|---|---|---|---|
| 4,853,843 A | * | 8/1989 | Ecklund | ............. G06F 16/2379 707/999.203 |
| 6,185,666 B1 | * | 2/2001 | Murray | ................. G06F 3/0674 713/100 |

(Continued)

FOREIGN PATENT DOCUMENTS

| | | |
|---|---|---|
| CN | 101535968 A | 9/2009 |
| CN | 101916578 A | 12/2010 |

(Continued)

OTHER PUBLICATIONS

International Search Report in the international application No. PCT/CN2021/123546, mailed on Jan. 12, 2022, 3 pages.

(Continued)

*Primary Examiner* — Douglas M Slachta
(74) *Attorney, Agent, or Firm* — Cooper Legal Group, LLC

(57) ABSTRACT

The present application provides a file update method, a file update apparatus, a device and a storage medium. The method includes: downloading an update data package to a target disk partition where a file package to be updated is located, the update data package being used for updating the file package; performing virtual combination on a directory of the file package and a directory of the update data package to obtain a temporary file package; and in cases where the (Continued)

verification of the temporary file package is successful, incorporating the update data package into the directory of the file package.

17 Claims, 14 Drawing Sheets

(56) References Cited

U.S. PATENT DOCUMENTS

| | | | | |
|---|---|---|---|---|
| 7,549,042 | B2* | 6/2009 | Glaum | G06F 8/658 |
| | | | | 713/1 |
| 7,730,295 | B1* | 6/2010 | Lee | G06F 9/4401 |
| | | | | 713/1 |
| 7,756,821 | B2* | 7/2010 | Havens | G06F 16/235 |
| | | | | 707/600 |
| 7,805,469 | B1* | 9/2010 | Nagaralu | G06F 16/119 |
| | | | | 707/822 |
| 8,280,908 | B2* | 10/2012 | Khalidi | G06F 16/192 |
| | | | | 707/791 |
| 9,015,837 | B1* | 4/2015 | De Los Reyes | G06F 8/65 |
| | | | | 717/172 |
| 10,789,062 | B1 | 9/2020 | Suryanarayana | |
| 2004/0093597 | A1* | 5/2004 | Rao | G06F 8/65 |
| | | | | 717/170 |
| 2005/0132179 | A1 | 6/2005 | Glaum | |
| 2008/0077634 | A1* | 3/2008 | Quakenbush | G06F 16/128 |
| 2009/0113199 | A1* | 4/2009 | Gattegno | G06F 9/44505 |
| | | | | 713/100 |
| 2012/0246442 | A1* | 9/2012 | Dolgunov | G06F 21/57 |
| | | | | 711/E12.078 |
| 2013/0332916 | A1* | 12/2013 | Chinn | G06F 8/65 |
| | | | | 717/169 |
| 2015/0309783 | A1* | 10/2015 | Labana | G06F 8/65 |
| | | | | 717/168 |
| 2017/0068810 | A1* | 3/2017 | Yao | G06F 21/44 |
| 2019/0121978 | A1* | 4/2019 | Kraemer | G06F 21/565 |
| 2020/0218529 | A1 | 7/2020 | Cheng | |
| 2020/0356358 | A1 | 11/2020 | Giri | |
| 2020/0387482 | A1* | 12/2020 | Blair | G06F 16/178 |

FOREIGN PATENT DOCUMENTS

| | | |
|---|---|---|
| CN | 101957765 A | 1/2011 |
| CN | 103218248 A | 7/2013 |
| CN | 103777987 A | 5/2014 |
| CN | 106021373 A | 10/2016 |
| CN | 107861686 A | 3/2018 |
| CN | 109542493 A | 3/2019 |
| CN | 109634645 A | 4/2019 |
| CN | 110018994 A | 7/2019 |
| CN | 112463191 A | 3/2021 |
| CN | 112631832 A | 4/2021 |

OTHER PUBLICATIONS

English translation of the Written Opinion of the International Search Authority in the international application No. PCT/CN2021/123546, mailed on Jan. 12, 2022, 5 pages.

Ma Miaoli et al., "Research on Incremental Network Coding Method for Cloud Storage Based on Byte Level Optimization Update", Netinfo Security, 2018, 18(11): 18-26, doi: 10.3969/j.issn.1671-1122.2018.11.003, the whole document. 9 pages with English abstract.

* cited by examiner

FILE UPDATE METHOD AND APPARATUS, DEVICE AND STORAGE MEDIUM

CROSS-REFERENCE TO RELATED APPLICATIONS

The application is based on and claims priority to Chinese Patent Application No. 202011351980.1 filed on Nov. 26, 2020, the entire contents of which are incorporated herein by reference in its entirety.

TECHNICAL FIELD

The disclosure relates to the field of computer technologies, and relates to, but is not limited to, a file update method and apparatus, a device, and a storage medium.

BACKGROUND

A smart terminal device (e.g. smartphone, smart speaker, or the like.) often needs to upgrade its software system during its lifecycle to fix defects of the old version on one hand, and to upgrade to a version with new features to enhance user experience on the other hand. The mainstream online upgrade method is Over The Air (OTA), i.e., a device downloads an upgrade package via mobile data or WIFI network and completes upgrade. After the upgrade package is downloaded, the device sometimes needs to be restarted depending on different upgrade targets and solutions.

According to the upgrade object, OTA may be divided into Software OTA (SOTA) and Firmware OTA (FOTA). SOTA is for application software/APP upgrade, and FOTA is for upgrading system firmware such as bootloader, kernel, rootfs, or the like.

One keypoint of OTA upgrade is robustness, i.e. it is possible to fall back to the old version when OTA upgrade fails, without rendering the system or software unavailable or even bricked. This is especially important for FOTA upgrade. Directly upgrading operation system firmware, such as kernel or rootfs, has a high probability of causing the system unstartable and unusable when the upgrading fails.

With respect to the above problems, there are two common solutions in the industry. In one of the solutions, main/standby is switched to standby/main, and in the other solution, a "recovery mode" is deployed. However, in both solutions, additional storage space overhead is needed. In particular, for the solution in which main/standby is switched to standby/main, it is required to reserve an additional set of complete system partition space, which usually requires tens or hundreds of megabytes (MB) or even more.

SUMMARY

In view of this, the disclosure provides a file updating method and apparatus, a device, and a storage medium to solve at least one problem in the related art, which can complete file update without introducing additional storage space overhead.

Technical solutions of the disclosure are implemented as follows.

In a first aspect, an embodiment of the disclosure provides a file update method, including the following operations.

An update data package is downloaded to a target disk partition where a to-be-updated file package is located, herein the update data package is used to update the to-be-updated file package.

A directory of the to-be-updated file package and a directory of the update data package are virtually merged to obtain a temporary file package.

The update data package is merged into the directory of the to-be-updated file package when verification of the temporary file package succeeds.

In a second aspect, an embodiment of the disclosure provides a file update apparatus, including a downloading unit, a stacking unit and a writing unit.

The downloading unit is configured to download an update data package to a target disk partition where a to-be-updated file package is located, herein the update data package is used to update the to-be-updated file package.

The stacking unit is configured to virtually merge a directory of the to-be-updated file package and a directory of the update data package to obtain a temporary file package.

The writing unit is configured to merge the update data package into the directory of the to-be-updated file package when verification of the temporary file package succeeds.

In a third aspect, an embodiment of the disclosure provides a computer device, including a memory, a processor and a computer program stored in the memory and executable on the processor, here the processor implements steps of the above file update method when executing the computer program.

In a fourth aspect, an embodiment of the disclosure provides a computer-readable storage medium having stored thereon a computer program that implements steps of the above file update method when executed by a processor.

The embodiments of the disclosure provide a file update method and apparatus, a device, and a storage medium. The method includes the following operations. An update data package is downloaded to a target disk partition where a to-be-updated file package is located, herein the update data package is used to update the to-be-updated file package. A directory of the to-be-updated file package and a directory of the update data package are virtually merged to obtain a temporary file package. The update data package is merged into the directory of the to-be-updated file package when verification of the temporary file package succeeds. Sequentially, the update data package which updates the to-be-updated files is downloaded to the target disk space where a to-be-updated file package is located without the need to provide an additional disk partition for the update data package. In addition, by virtually merging the directory of the to-be-updated file package and the directory of the update data package, the to-be-updated file package and the update data package are stacked to obtain the temporary file package, and after verification of the temporary file package is completed, the update data package is merged into the directory of the to-be-updated file package to complete update of the update data package to the to-be-updated file package, thereby ensuring robustness of update without introducing additional disk overhead.

DETAILED DESCRIPTION

In order to make the purpose, technical solutions and advantages of the embodiments of the disclosure more clearly, the technical solutions in the disclosure will be described more clearly below in conjunction with the drawings in the embodiments of the disclosure. The following embodiments are used to illustrate the disclosure, but not to limit the scope of protection of the disclosure.

Embodiments of the disclosure may be provided as a file update method and apparatus, a device, and a storage medium. In a practical application, the file update method may be implemented by a file update apparatus, and various functional entities in the file update apparatus may be implemented by hardware resources of a computer device, such as computing resources like processors, or the like, and communication resources (e.g., for supporting the implementation of various methods of communication such as optical fiber, cellular, or the like.) in concert.

Figure 1:
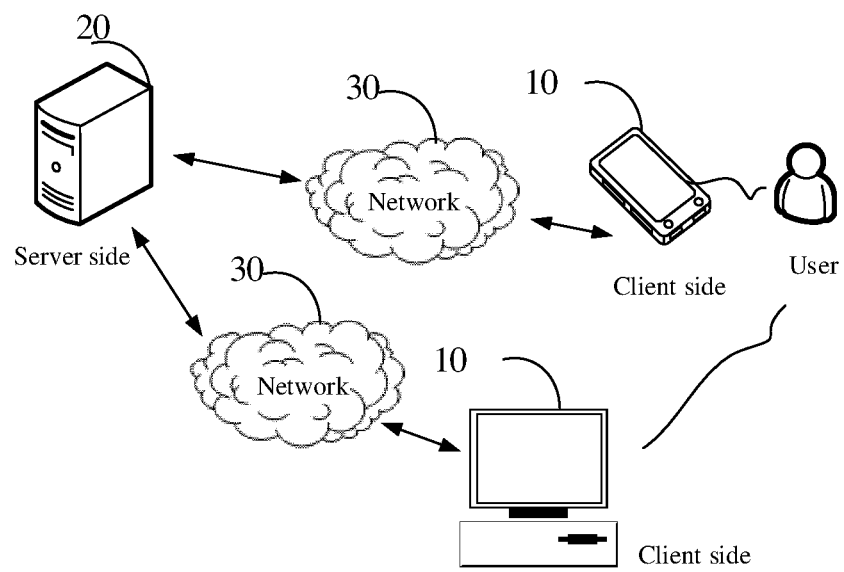
FIG. 1 is an optional schematic diagram of a network architecture according to an embodiment of the disclosure.

The file update method of an embodiment of the disclosure may be applied to the information processing system shown in FIG. 1. As shown in FIG. 1, the information processing system includes a client side 10 and a server side 20. The client side 10 is installed with a file management program which may perform downloading an update data package from the network side and updating the to-be-updated file package. The server side 20 may generate an update data package based on the update files, and sending the update data package to the client side 10, and the client side updates the to-be-updated file package based on the downloaded data package. The interaction between the client side 10 and the server side 20 takes place over a network 30.

The client side 10 may be implemented as a file update apparatus which implements a file update method. The client side 10 downloads an update data package from the server side 20 to a target disk partition where a to-be-updated file package is located. The update data package is used to update the to-be-updated file package. The client side virtually merges a directory of the to-be-updated file package and a directory of the update data package to obtain a temporary file package; and merges the update data package into the directory of the to-be-updated file package when verification of the temporary file package succeeds.

In an embodiment, the server side 10 is a cloud server.

In conjunction with the schematic diagram of the application scenario shown in FIG. 1, an embodiment of the disclosure proposes a file update method, which can complete file update without introducing additional storage space overhead.

The embodiments of the file update method and apparatus, the device, and the storage medium provided by the embodiments of the disclosure are described below in conjunction with the schematic diagram of the information processing system shown in FIG. 1.

An embodiment provides a file update method applied to a file update device, the file update device may be a client side, and the client side may be a computer device. The function achieved by the method may be achieved by a processor in the computer device by calling program codes, and of course, the program codes may be saved in a computer storage medium. It can be seen that the computer device includes at least a processor and a storage medium.

Figure 2:
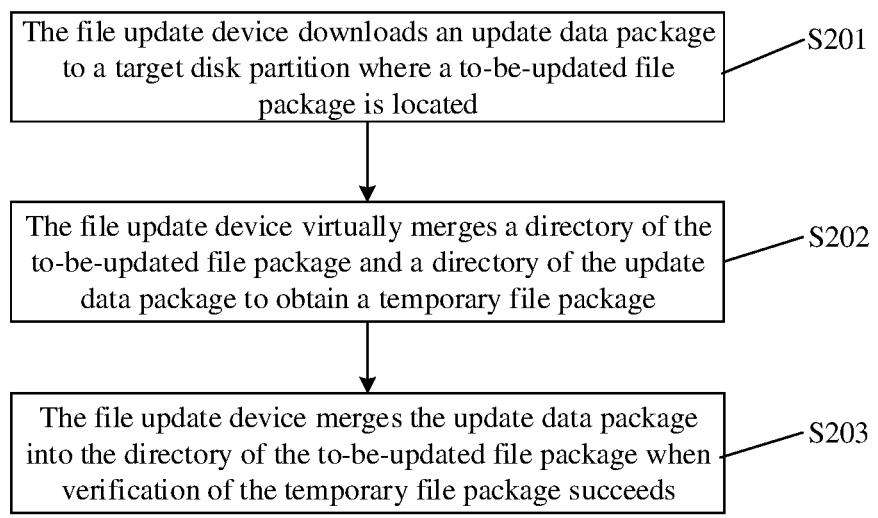
FIG. 2 is an optional schematic flowchart of a file update method according to an embodiment of the disclosure.

FIG. 2 is a schematic flowchart of an implementation of a file update method according to an embodiment of the disclosure. As shown in FIG. 2, the method may include the following operations.

In operation S201, the file update device downloads an update data package to a target disk partition where a to-be-updated file package is located.

The update data package is used to update the to-be-updated file package.

Here, files in the update data package are referred to as update files, and files in the to-be-updated file package are referred to as to-be-updated files. The update data package includes at least one update file, and the to-be-updated file package includes at least one to-be-updated file.

The file update device downloads the update data package from the server side in a waiting state. In the embodiment of the disclosure, the downloaded update data package is different based on different scenarios of file update. In a scenario of file upgrade, the downloaded update data package is an upgrade package, which may be referred to as an OTA upgrade package. In a scenario of file fallback, the downloaded update data package is a fallback package, which may be referred to as an OTA fallback package.

The application scenarios of the file update method according to the embodiment of the disclosure are not limited to scenarios of file upgrade or file fallback, and may also be used in other scenarios where the files in the file update device are updated.

The update data package and the to-be-updated file package belong to the file packages of the same application, or may be firmwares in the same file system.

Before downloading the update data package, the file update device determines the target disk partition where the to-be-updated data package is located, and downloads the update data package to the determined target disk partition. In an embodiment, the target disk partition is the root file system (rootfs).

In the embodiment of the disclosure, the layout of the directory of the update data package is the same as the layout of the directory of the to-be-updated file package.

In an example, the directory of the update data package includes a directory 1 and a directory 2. Here, the directory 1 includes a file 1 and a file 2, and the directory 2 includes a file 3. The to-be-updated files in the to-be-updated file package include a file 3, a file 4, a file 5, and a file 6. The directory of the to-be-updated file package includes subdirectories, i.e., a directory 1 and a directory 2, Here, the directory 1 includes the file 4 and the file 5, and the directory 2 includes the file 3 and the file 6.

In the embodiment of the disclosure, for files with the same name, the full path in the update data package is the same as the full path in the to-be-updated file package.

In an example, the directory of the update data package includes a directory Dir-A and a directory Dir-B, the files in the directory Dir-A include a file File-1, and the files in the directory Dir-B include a file File-4. The full paths of the file File-1 and File4 in the update data package are /Dir-A/File-1 and /Dir-B/File4 respectively. The directory of the to-be-updated file package includes a directory Dir-A and a directory Dir-B, the files in the directory Dir-A include a file File-1 and a file File-2, the files in the directory Dir-B include a file File-3. In such case, the full paths of the files File-1 to File3 in the to-be-updated file package are /Dir-A /File-1, /Dir-A/File-2, and /Dir-B/File-3.

In the embodiment of the disclosure, the file update device may enter a download completion state after completing downloading of the update data package and perform a primary restart in the download completion state.

In operation S202, the file update device virtually merges a directory of the to-be-updated file package and a directory of the update data package to obtain a temporary file package.

The to-be-updated files in the to-be-updated file package and the update files in the update data package are called according to the directory of the to-be-updated file package and the directory of the update data package, and the to-be-updated file package and the update data package are stacked to obtain the temporary file package.

During the process of executing the primary restart, the file update device stacks the to-be-updated file package and the update data package according to the directory of the to-be-updated file package and the directory of the update data package. Here, the file update device virtually merges the directory of the update data package and the directory of the to-be-updated file package to obtain a new file directory, i.e., a mount directory, and calls each update file in the update data package and each to-be-updated file in the to-be-updated file package based on the mount directory, to obtain the temporary file package.

In the embodiment of the disclosure, when the update files and the to-be-updated files are called, the called files are different based on the update method of the update files. Here, the update methods include several cases, such as replacing, deleting, adding and maintaining. For files which are present in both the to-be-updated file package and the upgrade data package and have the same path, the update method is replacing, i.e., the file in the update data package is used to replace/overwrite the file with the same name in the to-be-updated file package; for a new file which is present in the update data package but not present in the to-be-updated file package, the update method is adding; for a file which is not involved in the update data package, the update method is maintaining when not explicitly identified, i.e. the file in the to-be-updated file package is used; for a file which is not involved in the update data package and is explicitly identified as a file needed to be deleted, the update method is deleting. Here, the marker identifying whether a file is to be deleted may be configured in update package configuration parameters. In the embodiment of the disclosure, the update method of each update file may be configured in the update package configuration parameters.

In the process of virtual merging, when the update method is replacing, the path of the file in the update data package is added to the mount directory; when the update method is adding, the path of the file in the update data package is added to the mount directory; when the update method is maintaining, the path of the file in the to-be-updated file package is added to the mount directory; and when the update method is deleting, the path of the file in the to-be-updated file package is hidden and not added to the mount directory.

In the embodiment of the disclosure, when the directory of the update data package and the directory of the to-be-updated file package are virtually merged, only the path of each file is merged, and the file itself is not replaced, deleted, or the like.

In a practical application, after completing mounting of the root file system where the to-be-updated file is located and before changing the root directory to the root file system, the file update device may virtually merge the directory of the to-be-updated file package and the directory of the update data package to obtain the temporary file package.

Here, for a user, the temporary file package which may be seen is the same as the target file package which is expected to be obtained, but the files included in the temporary file package are in the underlying file system such as the root file system, and in the temporary file package, the files which belong to the update data package are located in the directory where the update data package is located, the files which belong to the to-be-updated file package are located in the directory where the to-be-updated file package is located, i.e., the update data package and the to-be-updated file package are not actually merged.

The file update device verifies the temporary file package after obtaining the temporary file package. In the embodiment of the disclosure, verification methods for verification of the temporary file package may include performing some functions of the temporary file package such as file reading and writing, service detection, or the like, and the version information of the temporary file package may also be compared with the corresponding version information of the to-be-updated file package to determine whether to perform an upgrade. Here, the verification method for verification of the temporary file package may be set according to actual needs, which is not limited in any way in the embodiment of the disclosure.

After determining that verification of the temporary file package succeeds, the file update device enters a verification success state, triggers a secondary restart, and executes an operation S203. After determining that verification of the temporary file package fails, the file update device deletes the update data package.

Here, after deleting the update data package, the file update device performs a secondary restart, loads the root file system where the to-be-updated file is located, and completes recovery of the system.

In operation S203, the file update device merges the update data package into the directory of the to-be-updated file package when verification of the temporary file package succeeds.

The file update device performs a secondary restart when verification of the temporary file package succeeds. During the secondary restart, after completing mounting of the target disk partition and before the root directory is changed to the root file system, the file update device writes the update data package to the directory where the to-be-updated file package is located, and merges the update data package and the to-be-updated file package in order to update the to-be-updated file package by the update data package.

Here, when the update data package is written, the to-be-updated files in the to-be-updated file package are processed according to the update method corresponding to each update file. When the update method is replacing, the to-be-updated file is overwritten with the update file with the same file name; when the update method is maintaining, the to-be-updated file is not modified; when the update method is adding, the update file is added to the to-be-updated file package; and when the update method is deleting, the to-be-updated file is deleted.

The target file package is obtained by updating the to-be-updated file package with the update data package.

The file update method according to the embodiment of the disclosure supports update of system files in the following scenarios.

In a first scenario, system files of an application (APP) are updated. The system files may include basic command bin files, lib library files, or the like.

In a second scenario, system-level update is performed. The updated files are the version files of the entire rootfs.

Therefore, the file update method according to the embodiment of the disclosure may support both APP and system-level update simultaneously.

The file update method according to the embodiment of the disclosure includes the following operations. An update data package is downloaded to a target disk partition where a to-be-updated file package is located, herein the update data package is used to update the to-be-updated file package. A directory of the to-be-updated file package and a directory of the update data package are virtually merged to obtain a temporary file package. The update data package is merged into the directory of the to-be-updated file package when verification of the temporary file package succeeds. Sequentially, the update data package which updates the to-be-updated files is downloaded to the target disk space where a to-be-updated file package is located, without the need to provide an additional disk partition for the update data package. In addition, by virtually merging the directory of the to-be-updated file package and the directory of the update data package, the to-be-updated file package and the update data package are stacked to obtain the temporary file package, and after verification of the temporary file package is completed, the update data package is merged into the directory of the to-be-updated file package to complete update of the update data package to the to-be-updated file package, thereby ensuring robustness of update without introducing additional disk overhead.

In some embodiments, the implementation of the operation S201 may include the following operation. The update data package is downloaded to a first space area of the target disk space, herein the to-be-updated file package is located in a second space area of the target disk space.

Here, the target disk space is the underlying file system rootfs, both the update data package and the to-be-updated file package are located in rootfs, and are located in different space regions, so that the directory of the update data package and the directory of the to-be-updated file package are separate directories.

In some embodiments, before the operation S202, a first upgrade parameter in a bootloader is set to a first value and a primary restart instruction is generated when it is detected that downloading of the update data package is completed, herein the first value indicates that downloading of the update data package is completed; and a primary restart is performed based on the primary restart instruction.

Correspondingly, the implementation of the operation S202 may include the following operation. The directory of the to-be-updated file package and the directory of the update data package are virtually merged to obtain the temporary file package when it is detected that the first upgrade parameter is the first value.

When the first upgrade parameter is the first value, then the first upgrade parameter indicates that the file update device is currently in a download completion state of the update data package. When the file update device detects that the first upgrade parameter is the first value during a restart, then the file update device virtually merges the directory of the to-be-updated file package and the directory of the update data package to obtain the temporary file package.

Here, after completing mounting of the root file system where the to-be-updated file is located and before changing the root directory to the root file system, the file update device may detect the value of the first upgrade parameter.

Figure 3:
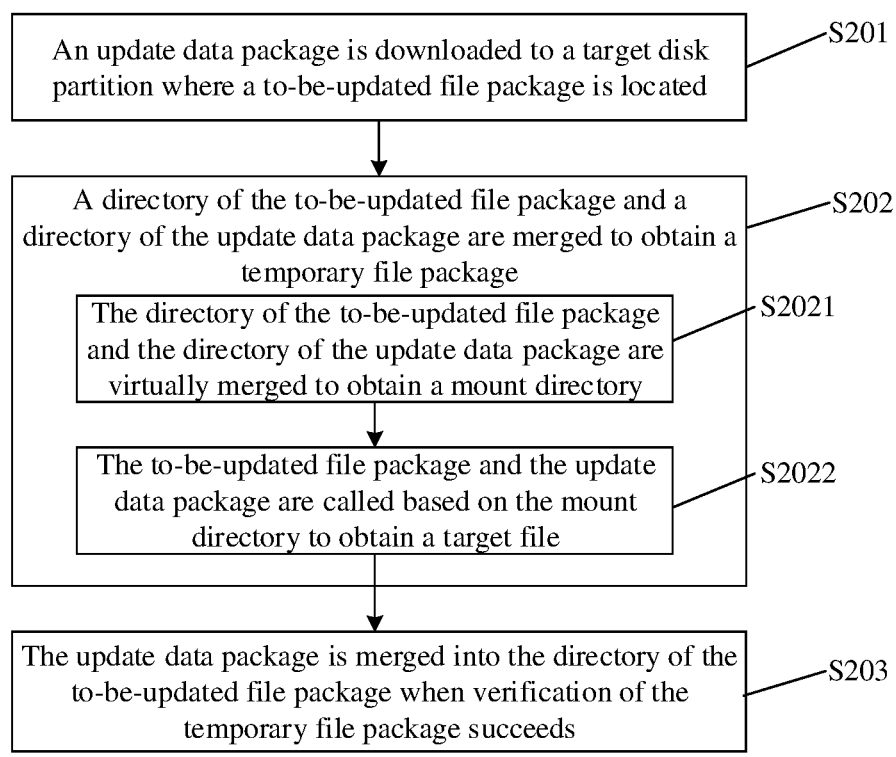
FIG. 3 is an optional schematic flowchart of a file update method according to an embodiment of the disclosure.

In some embodiments, as shown in FIG. 3, the implementation of the operation S202 includes the following operations.

In operation S2021, the directory of the to-be-updated file package and the directory of the update data package are virtually merged to obtain a mount directory.

In operation S2022, the to-be-updated file package and the update data package are called based on the mount directory to obtain the temporary file package.

In the embodiment of the disclosure, the directory of the update data package is taken as the upper layer directory and the directory of the to-be-updated file package is taken as the lower layer directory. The upper layer directory and the lower layer directory are virtually merged by the stack file system technology, and the folders corresponding to the upper layer directory and the folders corresponding to the lower layer directory are merged into the same directory. Here, the stack file system technology may be unionfs, aufs, overlayfs, or the like. Here, the merged directory is referred to as a mount directory, and the update files located in the upper layer directory and the to-be-updated files located in the lower layer directory in the mount directory are called based on the mount directory.

In some embodiments, the implementation of the operation S2021 may include the following operations.

A path of a first file in the directory of the update data package is added to the mount directory, herein the first file has a same name as a second file in the directory of the to-be-updated file package; a path of a third file in the directory of the update data package is added to the mount directory, herein the third file is an added file of the update data package relative to the to-be-updated file package; and a fourth file in the directory of the to-be-updated file package is added to the mount directory, herein the fourth file is a maintained file in the directory of the to-be-updated file package.

Here, the update method relates to several cases such as replacing, deleting, adding, maintaining, or the like. When virtual merge is performed, the files in the update data package are traversed and compared with the files with the same path in the to-be-updated file package. For files with the same name which are present in both the to-be-updated file package and the upgrade data package and have the same path (the first file in the update data package, and the second file in the to-be-updated file package), the update method is replacing, and the path of the first file is added to the mount directory; for a new file which is not present in the to-be-updated file package, i.e. the third file, the update method is adding, and the path of the third file is added to the mount directory; for a file which is not involved in the update data package and needs to be used, i.e. the fourth file, the update method is maintaining, and the path of the fourth file is added to the mount directory; for a file which is not involved in the update data package but is identified as a file needed to be deleted, i.e. the fifth file, the update method is deleting, and the path of the fifth file is hidden and will not be added to the mount directory.

Figure 4:
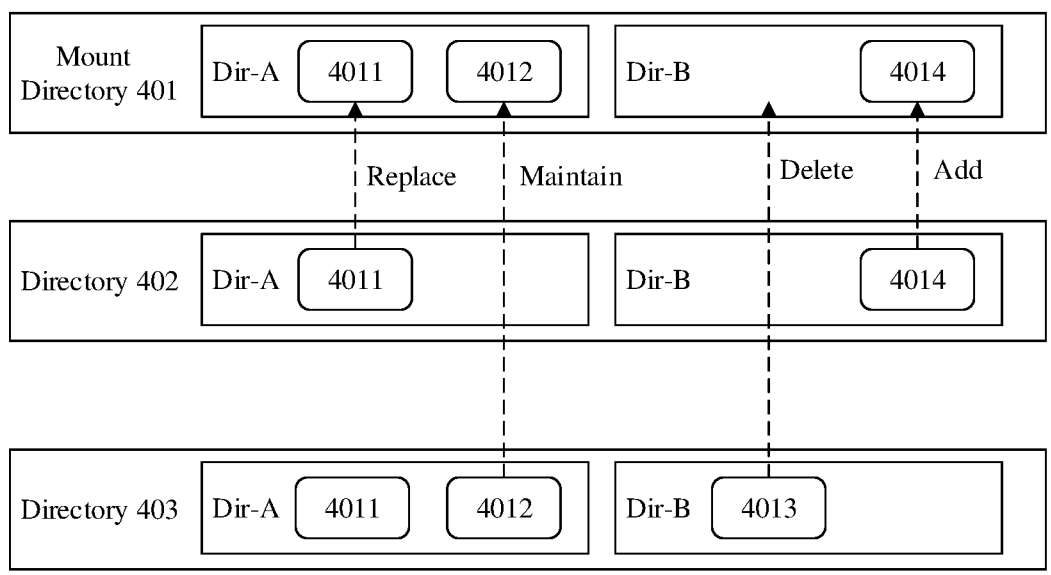
FIG. 4 is an optional schematic diagram of virtually merging files according to an embodiment of the disclosure.

In an example, as shown in FIG. 4, the directory of the update data package is a directory 402, the directory of the to-be-updated file package is a directory 403, and the directory 402 and directory 403 are virtually merged into a mount directory 401. Here, the directory 402 includes a directory Dir-A and a directory Dir-B, and the files in the directory Dir-A include a file 4011, the files in the directory Dir-B includes a file 4014; the directory 403 includes a directory Dir-A and a directory Dir-B, and the files in the directory Dir-A include a file 4012, the files in the directory Dir-B include a file 4013. Here, the update method which the file 4011 corresponds to is replacing, then the path of the file 4011 in the directory 402 is added to the mount directory 401; the update method which the file 4012 corresponds to is maintaining, then the path of the file 4012 in the directory 403 is added to the mount directory 401; the update method which the file 4013 corresponds to is deleting, then the path of the file 4013 is not added to the mount directory 401; and the update method which the file 4014 corresponds to is adding, then the path of the file 4014 is not added to the mount directory 401. Then, the directories under the mount directory include Dir-A and Dir-B, the files in Dir-A include the file 4011 and the file 4012, and the files in Dir-B include the file 4014.

In some embodiments, before the operation S203, the file update method may further include the following operations.

A second upgrade parameter in a bootloader is set to a second value and a secondary restart instruction is generated when it is detected that verification of the called file succeeds, herein the second value indicates that verification of the called file succeeds.

A secondary restart is performed based on the secondary restart instruction.

Correspondingly, the implementation of the operation S203 may include the following operation. The update data package is written into the directory of the to-be-updated file package when it is detected that the second upgrade parameter is the second value.

When the second upgrade parameter is the second value, then the second upgrade parameter indicates that the current file update device is in a verification success state. When it is detected that the second upgrade parameter is the second value during a restart, the file update device merges the update data package and the to-be-updated file package to update the to-be-updated file package by the update data package.

Here, after completing mounting of the root file system where the to-be-updated file is located and before changing the root directory to the root file system, the file update device may detect the value of the second upgrade parameter.

In a practical application, the first update parameter and the second update parameter may be the same parameter.

Figure 5:
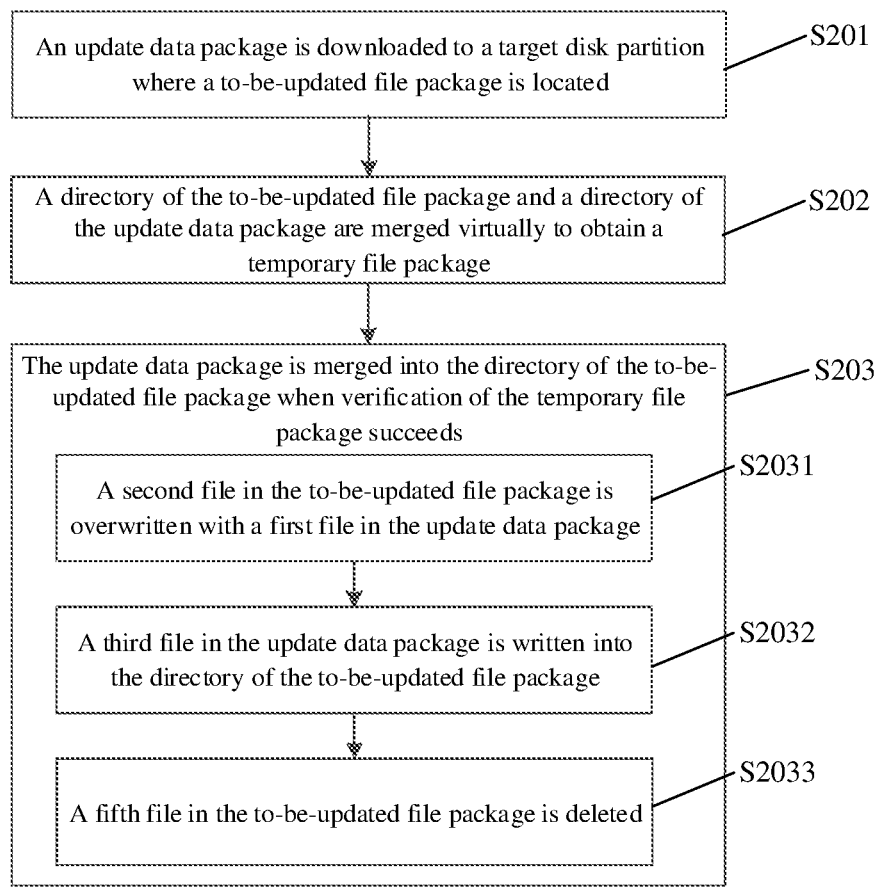
FIG. 5 is an optional schematic flowchart of a file update method according to an embodiment of the disclosure.

In some embodiments, as shown in FIG. 5, the implementation of the operation S203 may include the following operations.

In operation S2031, a second file in the to-be-updated file package is overwritten with a first file in the update data package. Here, the first file has a same name as the second file.

In operation S2032, a third file in the update data package is written into the directory of the to-be-updated file package. Here, the third file is a file other than the first file in the update data package.

In operation S2033, a fifth file in the to-be-updated file package is deleted. Here, the fifth file is a to-be-deleted file in the to-be-updated file package.

Here, the update method relates to several cases such as replacing, deleting, adding, maintaining, or the like. When merge is performed, the files in the update data package are traversed and compared with the files with the same path in the to-be-updated file package. For files with the same name which are present in both the to-be-updated file package and the upgrade data package and have the same path (the first file in the update data package, and the second file in the to-be-updated file package), the update method is replacing, and the second file is overwritten with the first file; for a new file which is not present in the to-be-updated file package, i.e. the third file, the update method is adding, and the third file is added to the to-be-updated file package; for a file which is not involved in the update data package and needs to be used, i.e. the fourth file, the update method is maintaining, and the fourth file is maintained unchanged; for a file which is not involved in the update data package but is identified as a file needed to be deleted, i.e. the fifth file, the update method is deleting, and the fifth file is deleted from the to-be-updated data package.

In an example, the directory of the update data package is a directory 402, the directory of the to-be-updated file package is a directory 403, and the directory 402 and directory 403 are virtually merged into a mount directory 401. Here, the directory 402 includes a directory Dir-A and a directory Dir-B, and the files in the directory Dir-A include a file 4011, the files in the directory Dir-B include a file 4014; the directory 403 includes a directory Dir-A and a directory Dir-B, and the files in the directory Dir-A include a file 4012, the files in the directory Dir-B include a file 4013. Here, the update method which the file 4011 corresponds to is replacing, then the file 4011 in the directory 403 is replaced with the file 4011 in the directory 402; the update method which the file 4012 corresponds to is maintaining, then the file 4012 is maintained unchanged; the update method which the file 4013 corresponds to is deleting, then the file 4013 is deleted; and the update method which the file 4014 corresponds to is adding, then the file 4014 in the directory 402 is added to directory 403.

The scenario where file upgrade is file update being taken as an example, the file update method according to the embodiment of the disclosure is further described as follows.

In order to ensure robustness of file upgrade, common OTA solutions include main/standby switch and deployment of "recovery mode".

Figure 6:
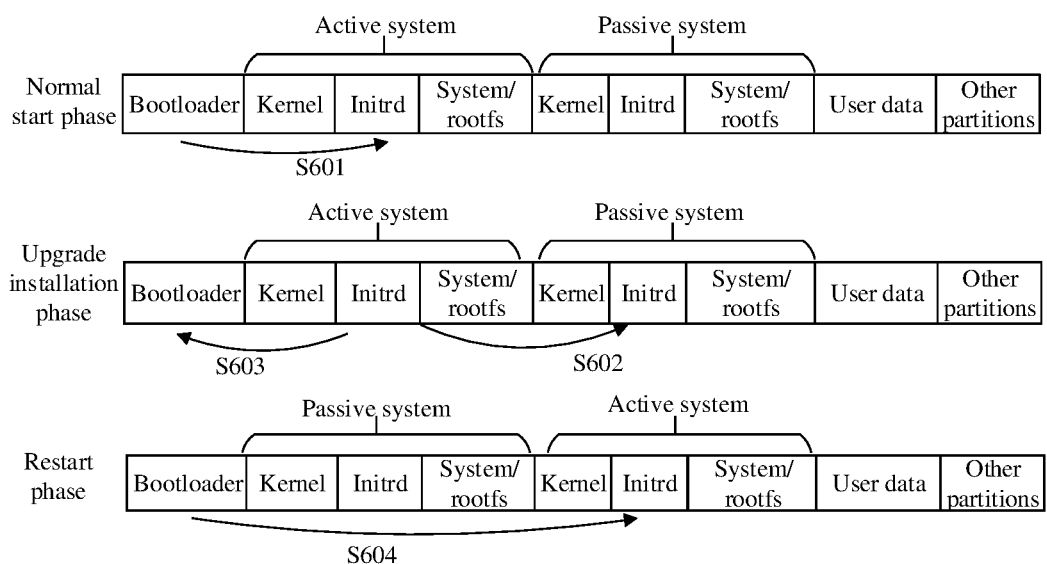
FIG. 6 is an optional schematic flowchart of a file update method in the related art.

The principle of file upgrade using the main/standby switch is shown in FIG. 6, where the disk is reserved for two complete system partitions: an active system and a passive system, and each complete system partition includes kernel, a temporary root file system (initrd) and a root file system (rootfs). When the active system is currently used, the passive system of the other partition is directly updated after the upgrade package is downloaded, and parameters are set to notify the bootloader. After a restart, the passive system of the new system partition is switched to, and the upgrade is completed.

As shown in FIG. 6, the file upgrade process includes three phases: a normal start phase, an upgrade installation phase and a restart phase. The file upgrade process includes the following operations.

In operation S601, the active system is booted and an OTA upgrade package is downloaded.

In operation S602, the OTA upgrade package is installed and the passive system is updated.

In operation S603, the bootloader is notified of main/standby switch.

In operation S604, after a restart, the new active system, i.e. the updated passive system is booted.

Figure 7:
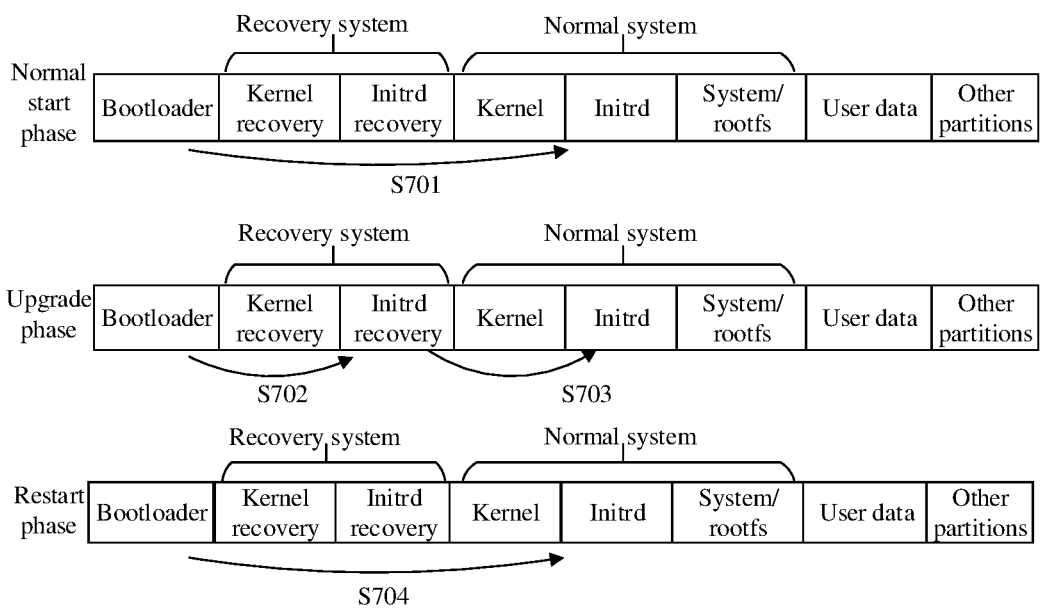
FIG. 7 is an optional schematic flowchart of a file update method in the related art.

The principle of file upgrade using the deployment of "recovery mode" is shown in FIG. 7, where the disk is reserved for a compact partition: a recovery system, and the recovery system includes limited functions of kernel and initrd. After downloading the upgrade package, the device firstly restarts and enters the recovery system, then updates the normal system partition, and triggers a restart and enters the normal system after completion. If the upgrade fails, the recovery mode is entered and the version is re-upgraded to recover.

As shown in FIG. 7, the file upgrade process includes three phases: a normal start phase, an upgrade phase and a restart phase. The file upgrade process includes the following operations.

In operation S701, the normal system is booted and an OTA upgrade package is downloaded.

In operation S702, the recovery system is started.

In operation S703, the OTA upgrade package is installed and the normal system is updated.

In operation S704, after a restart, the updated normal system is booted.

Both of the above file upgrade solutions introduce additional storage space overhead to ensure robustness of the upgrade process. In particular, for the solution of main/standby switch, it is required to reserve an additional set of complete system partition space, which usually requires tens or hundreds of megabytes (MB) or even more. This problem is not prominent in high-capacity storage devices such as smartphones, but in low-cost IoT (Internet of Things) smart devices, the impact of additional consumption of storage space is relatively large.

To solve the problems of the above solutions, an embodiment of the disclosure provides a file upgrade method which eliminates extra reserved disk space while ensuring the robustness of OTA upgrade.

Figure 8:
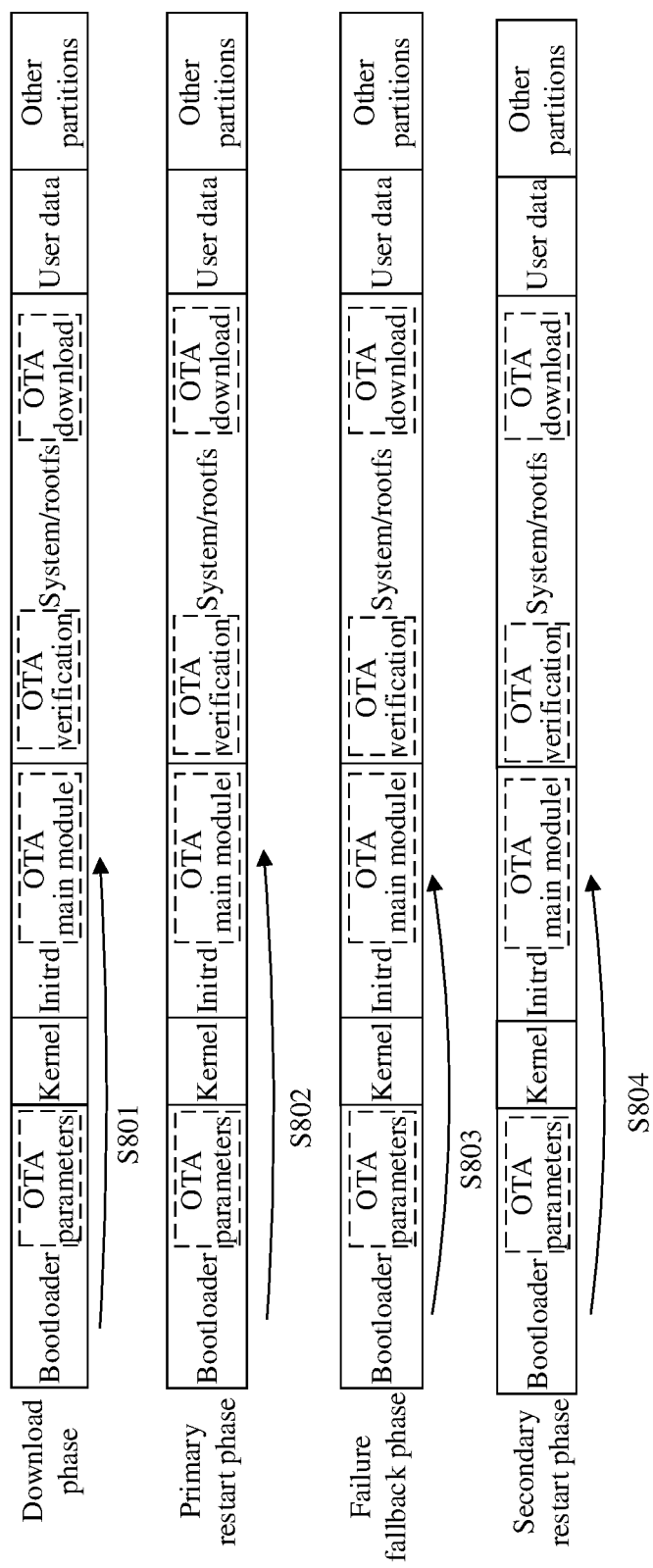
FIG. 8 is an optional schematic flowchart of a file update method according to an embodiment of the disclosure.

The file upgrade method according to the embodiment of the disclosure is shown in FIG. 8, where the disk space does not require additional disk space beyond the bootloader it has, the normal system and disk partitions such as user data partitions. Here, the normal system includes kernel, initrd and rootfs.

As shown in FIG. 8, the upgrade process of the file upgrade method according to the embodiment of the disclosure includes four phases: a download phase, a primary restart phase, a fallback phase, and a secondary restart phase. The file upgrade process includes the following operations.

In operation S801, an OTA upgrade package is downloaded.

In the download phase, an OTA upgrade package is downloaded. The downloaded OTA upgrade package is stored in the root file system of the disk partition, here, the to-be-upgraded original file is also stored in the root file system. After completion of the OTA upgrade package, the upgrade parameters in the device bootloader are in a download completion state and a restart is triggered to enter the primary restart phase.

In operation S802, the OTA upgrade package is upgrade verified by virtually merging the directories of the files.

During the primary restart, the OTA main module in initrd reads that the upgrade parameters are in the download completion state, then the OTA package is applied (virtually merged without replacement) using the stack file system technology.

Here, in the primary restart, when the root file system is not switched, a stacking mount is performed to "virtually merge" the directory of the OTA upgrade package and the directory of the original file package to apply the OTA package, i.e. the temporary file package.

If the application of the OTA package fails, the upgrade parameters are set to a verification failure state, a secondary restart is triggered, the failure fallback phase is entered, and an operation S803 is executed.

If the application of the OTA package succeeds, the root directory is changed and then the root file system is entered to execute verification of the OTA package. When the verification succeeds, the upgrade parameters are set to a verification success state, the secondary restart is triggered, the failure fallback phase is entered, and the operation S803 is executed; when the verification fails, the upgrade parameters are set to the verification failure state, the secondary restart triggered, the secondary restart phase is enter, and an operation S804 is executed.

In operation S803, the system is fallen back.

During the secondary restart that enters the failure fallback phase, the OTA main module in initrd reads that the upgrade parameters are in verification failure state, then deletes the OAT upgrade package, cancels the system calling of stacked files, loads the original root file system, and fall the original system back.

In operation S804, the file is replaced.

During the secondary restart in the secondary restart phase, the OTA main module in initrd reads that the upgrade parameters are in the verification success state, then triggers version replacement, reads the OTA upgrade package, and writes the read OTA upgrade package to the directory where the original file is located to replace the original file. After completing the file package merging of the original file such as replacing, adding and deleting, the root directory is changed to rootfs and rootfs is loaded after the file is updated.

Figure 9:
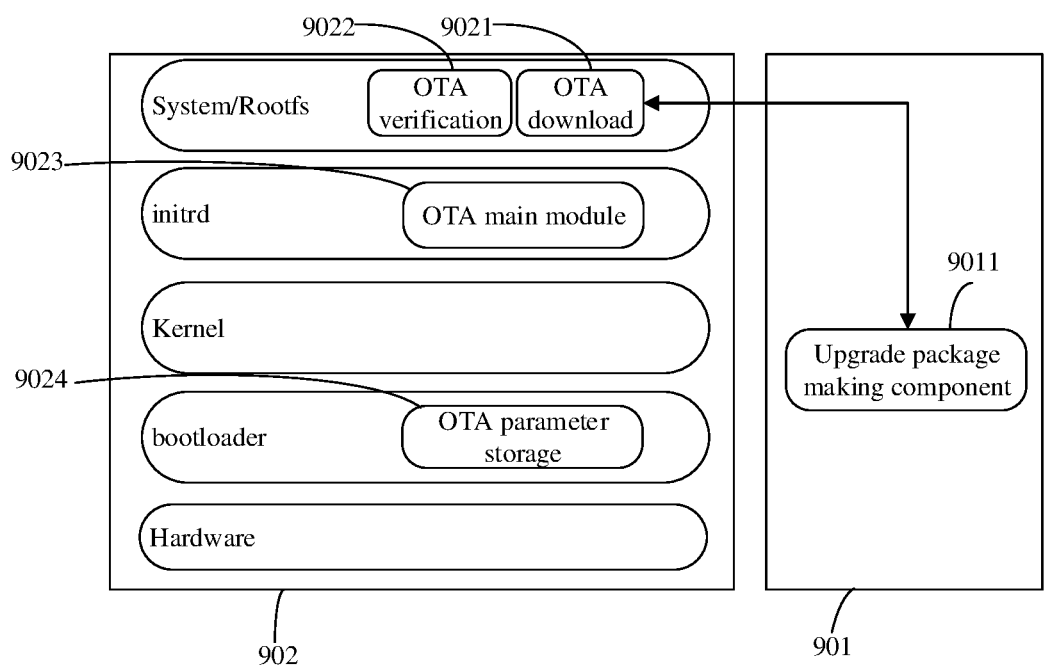
FIG. 9 is an optional schematic structural diagram of a file update device according to an embodiment of the disclosure.

The structure of an information system to which the file update method according to the embodiment of the disclosure is applied is shown in FIG. 9, and it includes a cloud side 901 and a device side 902. Here, the components of the cloud side 901 include an upgrade package making component 9011, and the components of the device side 902 include an OTA downloading 9021, an OTA verification 9022, an OTA main module 9023, and an OTA parameter storage 9024.

The upgrade package making 9011 is configured to make an OTA upgrade package.

The OTA downloading 9021 is located in system/rootfs and configured to download an OTA upgrade package from the cloud.

The OTA verification 9022 is located at system/rootfs and configured to verify the OTA package.

The OTA master module 9023 is located in initrd and configured to control application, verification and replacement of the OTA package.

The OTA parameter storage 9024 is located in bootloader and configured to store upgrade parameters.

Figure 10:
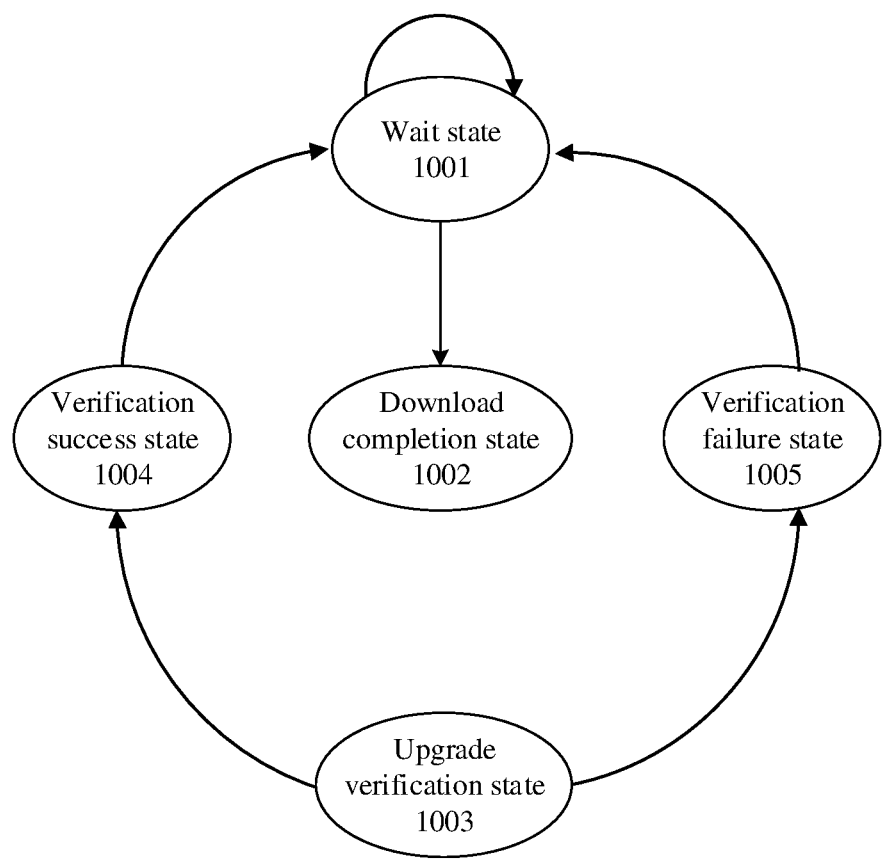
FIG. 10 is an optional schematic state transfer diagram of a file update method according to an embodiment of the disclosure.

A state transfer diagram of the file update device in the file update method according to the embodiment of the disclosure is shown in FIG. 10. The states of the file update device include a wait state 1001, a download completion state 1002, an upgrade verification state 1003, a verification success state 1004, and a verification failure state 1005.

In the wait state 1001, an OTA upgrade package is downloaded, and if downloading of the OTA upgrade package succeeds, the download completion state 1002 is entered; if downloading of the OTA upgrade package fails, the wait state 1001 is maintained.

In the download completion state 1002, the upgrade parameters are set, a primary restart is performed and upgrade verification is triggered, and the upgrade verification state 1003 is entered.

In the upgrade verification state 1003, the upgrade verification is performed, and if the upgrade verification succeeds, the verification success state 1004 is entered; if the upgrade verification fails, the verification failure state 1005 is entered.

In the verification success state 1004, a secondary restart is performed to complete file replacement and load the new system. The to-be-updated file in the new system is replaced with a new file.

In the verification failure state 1005, a secondary restart is performed to cancel the new system and load the original system. The to-be-updated file in the original system is the original file.

Figure 11:
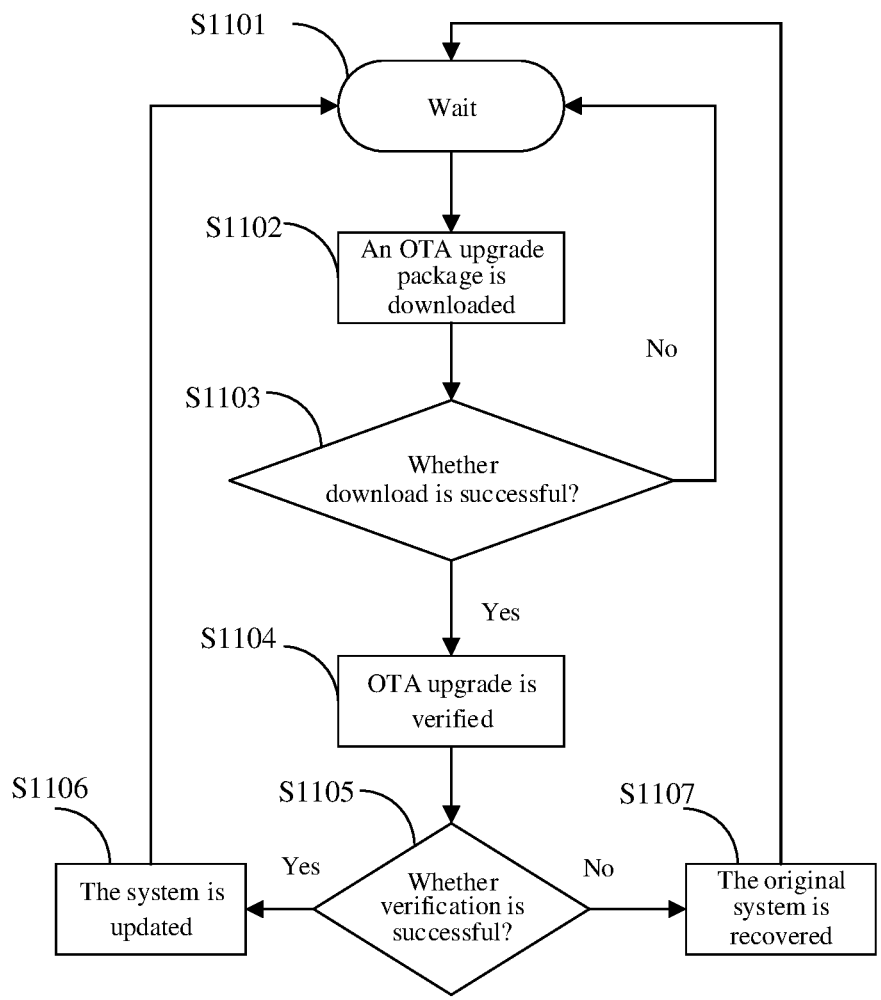
FIG. 11 is an optional schematic flowchart of a file update method according to an embodiment of the disclosure.

A file update method according to an embodiment of the disclosure is shown in FIG. 11, and it includes the following operations.

In operation S1101, wait.

In operation S1102, an OTA upgrade package is downloaded.

In operation S1103, it is determined whether the downloading of the OTA upgrade package succeeds.

When the downloading succeeds, an operation S1104 is executed, and when the downloading fails, the operation S1101 is executed.

In operation S1104, OTA upgrade is verified.

The file update device virtually merges the directory of the OTA upgrade and the directory of the original file by the stack file system technology to get a mount directory, and calls the OTA upgrade package and the original file based on the mount directory to get an OTA package, and verifies the OTA package.

In operation S1105, it is determined whether upgrade verification succeeds.

When the verification succeeds, an operation S1106 is executed, and when the verification succeeds, an operation S1107 is executed.

In operation S1106, the system is updated.

The original file in the system is replaced by OTA upgrade package to get the upgraded file, and a secondary restart is performed to load the new system.

In operation S1107, the original system is recovered.

The OTA upgrade package is deleted, and a secondary restart is performed to load the original system.

Figure 12:
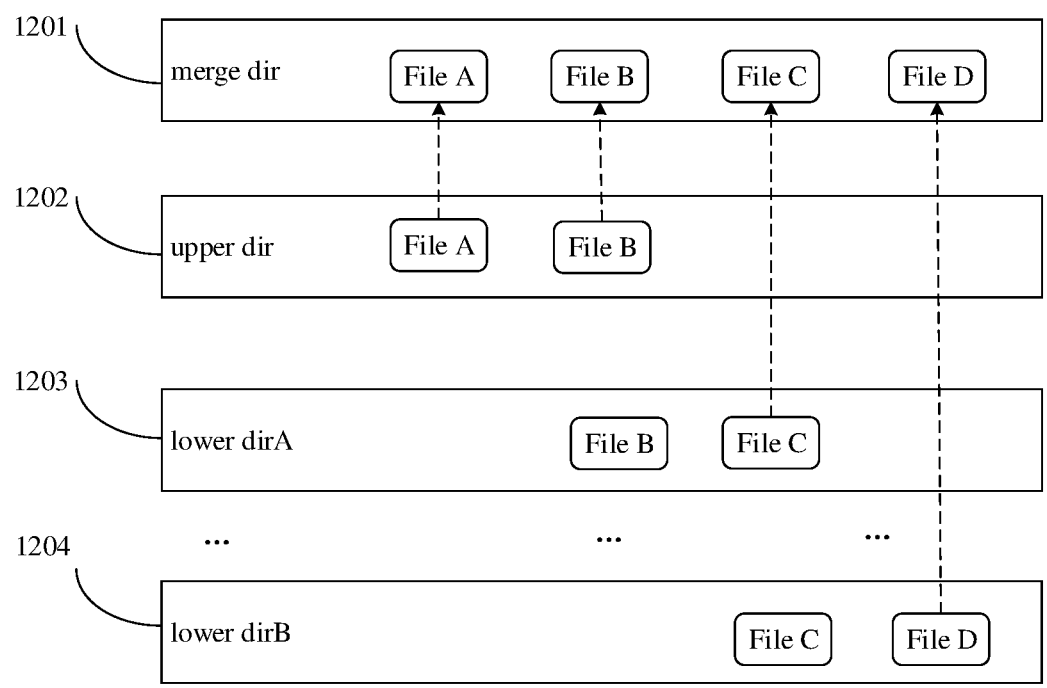
FIG. 12 is an optional schematic diagram of virtually merging files according to an embodiment of the disclosure.

In the embodiment of the disclosure, the stack file system technology is adopted in the making and upgrade verification of the OTA upgrade package, and the adopted stack file system technology may be unionfs, aufs, overlayfs, or the like. The technical principle of the stack file system technology is shown in FIG. 12, where a lower dir A 1203, a lower dir B 1204 and an upper dir 1202 are different directories from the underlying file system, which may be specified by the user, and include files and directories that the user wants to merge inside, and a merge dir 1201 is the mount point. After the file system is mounted, contents from the lower dir A 1203, the lower dir B 1204 and the upper dir 1202 will be seen simultaneously in the merge dir 1201, here, a file A and a file B from the upper dir 1202, a file C from the lower dir A 1203, and a file D from the lower dir B 1204 may be seen in the merge dir 1201. In addition, a user cannot (has no need to) know which files are from the lower dir and which are from the upper dir, and what the user sees is only a root directory of a normal file system, here, there may be more than one or only one lower dirs.

The upper dir and each of the lower dirs are different directories which are not exactly equivalent and have a hierarchical relationship. When there are files with the same name in both the upper dir and the lower dir, the file in the lower dir will be hidden and the user may only see the file from the upper dir, for example, in FIG. 12, both the lower dir A 1203 and the upper dir 1202 include a file B, the user may only see the file B from the upper dir 1202, and the file B in the lower dir A 1203 is hidden. For each of the lower dirs, there is also the same hierarchical relationship, where the file in a lower level is masked by the file with the same name in a higher level, for example, in FIG. 12, both the lower dir A 1203 and the lower dir B 1204 include a file C, the user may only see the file C from the lower dir A 120, and the file C in the lower dir B 1204 is hidden. In addition, if there are directories with the same name, then merging is continued.

For files which exist in both an upper dir and a lower dir (the full paths of files with the same name are the same), only the file in the upper dir will be displayed in the directory after the "virtual merge". For a file which does not exist in the upper dir, it may be displayed as a file in the lower dir, or be marked as to be deleted without being displayed. For example, when a file is marked as not to be deleted, it will be displayed as a file in the lower dir, and when marked as to be deleted, it will be deleted without being displayed. Based on this technical feature, the disclosure takes the directory of new version files and the directory of old version files as different directories, such as an upper dir and a lower dir, and generates an OTA upgrade package according to the difference between the new version and the old version. During OTA testing, the "virtual merge" technology is used for testing and verification.

The file update method according to an embodiment of the disclosure includes the following operations.

In operation S11, an OTA soft package is made.

The cloud side compares the differences between the two versions of the directory and makes an OTA upgrade package based on the stack file system technology; if necessary, security reinforce on the OTA upgrade package is performed, such as signature, encryption, or the like.

In operation S12, the OTA soft package is downloaded.

The device side downloads the OTA upgrade package using existing security channels and mechanism. If necessary, security verification on the OTA upgrade package is performed, such as signature verification, decryption, or the like.

In operation S13, the upgrade parameters are set as the download completion state.

After the OTA upgrade package is downloaded, the OTA parameter storage module interface (such as bootloader env partition/variable setting, typically) is used to update the OTA state indicated by the upgrade parameters to the download completion state, and a primary restart is triggered.

In operation S14, the OTA package is applied.

After the primary restart, the OTA main module in initrd is executed. The upgrade parameters read by the OTA main module are in the download completion state, and OTA upgrade testing verification is triggered.

Here, after mounting the root file system (mount system/rootfs) and before changing to the root file system (chroot system/rootfs), the device side performs a secondary mount on the root file system (system/rootfs) and "virtually merge" the directory of the OTA upgrade package and the directory of the old version files using the stack file system. If the secondary mount fails, the upgrade parameters are set as the verification failure state and a secondary restart is triggered.

If the secondary mount succeeds, the device side continues to execute chroot system/rootfs, and starts OTA verification service after performing necessary initialization. The verification service executes basic and user-customized verification processes (such as file reading and writing, service detection, version comparison, or the like.). When the verification succeeds, the upgrade parameters are set as the verification success state, and when the verification succeeds, the upgrade parameters are set as the verification failure state. Then a secondary restart is triggered.

In the embodiment of the disclosure, initrd is a temporary file system, its main purpose is to perform system initialization, and eventually switch to the root file system by the operation of mount and chroot. The switching process generally includes two steps. In the first step, the root file system (the disk partition where it located) is mounted, and in the second step, the root directory is switched to the mounted node by chroot. The primary mount is a necessary operation to mount the disk partition where the root file system is located, and the system may recognize the contents in the root file system only after the mount. In the embodiment of the disclosure, after the primary mount and before the chroot, a secondary mount is executed to get a temporary file package.

In operation S15, file replacement is performed.

After the secondary restart on the device side, the OTA main module in initrd is executed again. The OTA main module reads that the upgrade parameters are in the verification success state, and then triggers system update/version replacement.

Here, after mount of system/rootfs and before chroot of system/rootfs, the device side replaces, adds or deletes files in the system/rootf directory, i.e. files of the original system, using the directory files of the OTA upgrade package. The OTA upgrade package is deleted to free up disk space and obtain the new system. The upgrade parameters are updated to the wait state. Chroot is executed to switch to the new system, and upgrade of the files is completed.

In operation S16, the original system is recovered.

After the secondary restart on the device side, the OTA main module in initrd is executed again. The OTA main module reads that the upgrade parameters are in the verification failure state, and then triggers system recovery service.

Here, the device side records the relevant error information, deletes the directory of the OTA upgrade package, directly performs mount of system/rootfs, updates the state to "waiting", executes chroot, and recovers to the original system.

The file update method according to the embodiment of the disclosure has the following features.

Firstly, there is no need to reserve extra disk partition for OTA update, which improves system disk utilization.

Secondly, the making and application method of OTA upgrade package based on the stack file system technology ensures robustness of the update process. By "virtual merge", not only upgrade verification may be performed, but also the old system may be recovered in case of mount failure or verification failure, which is a technical effect that a direct replacement method cannot achieve.

Figure 13:
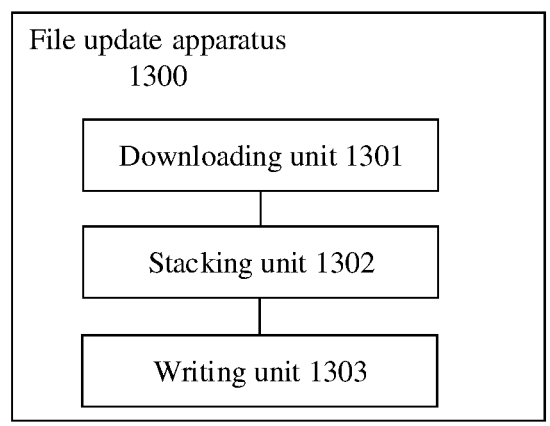
FIG. 13 is an optional schematic structural diagram of a file update apparatus according to an embodiment of the disclosure.

FIG. 13 is a schematic flowchart of an implementation of a file update apparatus according to an embodiment of the disclosure. As shown in FIG. 13, the apparatus 1300 includes a downloading unit 1301, a stacking unit 1302 and a writing unit 1303.

The downloading unit 1301 is configured to download an update data package to a target disk partition where a to-be-updated file package is located, herein the update data package is used to update the to-be-updated file package.

The stacking unit 1302 is configured to virtually merge a directory of the to-be-updated file package and a directory of the update data package to obtain a temporary file package.

The writing unit 1303 is configured to merge the update data package into the directory of the to-be-updated file package when verification of the temporary file package succeeds.

In some embodiments, the downloading unit 1301 is further configured to download the update data package to a first space area of the target disk space, herein the to-be-updated file package is located in a second space area of the target disk space.

In some embodiments, the apparatus 1300 may further include a first restart unit.

The first restart unit is configured to: set a first upgrade parameter in a bootloader to a first value and generate a primary restart instruction when it is detected that downloading of the update data package is completed, herein the first value indicates that downloading of the update data package is completed; and perform a primary restart based on the primary restart instruction, before virtually merging the directory of the to-be-updated file package and the directory of the update data package to obtain the temporary file package.

Correspondingly, the stacking unit is further configured to virtually merge the directory of the to-be-updated file package and the directory of the update data package to obtain the temporary file package when it is detected that the first upgrade parameter is the first value.

In some embodiments, the stacking unit 1302 is further configured to: virtually merge the directory of the to-be-updated file package and the directory of the update data package to obtain a mount directory; and call the to-be-updated file package and the update data package based on the mount directory to obtain the temporary file package.

In some embodiments, the stacking unit 1302 is further configured to: add a path of a first file in the directory of the update data package to the mount directory, herein the first file has a same name as a second file in the directory of the to-be-updated file package; add a path of a third file in the directory of the update data package to the mount directory, herein the third file is an added file of the update data package relative to the to-be-updated file package; and add a fourth file in the directory of the to-be-updated file package to the mount directory, herein the fourth file is a maintained file in the directory of the to-be-updated file package.

In some embodiments, the apparatus 1300 may further include a second restart unit.

The second restart unit is configured to: set a second upgrade parameter in a bootloader to a second value and generate a secondary restart instruction when it is detected that verification of the temporary file package succeeds, herein the second value indicates that verification of the temporary file package succeeds; and perform a secondary restart based on the secondary restart instruction.

Correspondingly, the writing unit 1303 is further configured to merge the update data package into the directory of the to-be-updated file package when it is detected that the second upgrade parameter is the second value.

In some embodiments, the writing unit 1303 is further configured to: overwrite a second file in the to-be-updated file package with a first file in the update data package, herein a name of the first file is the same as a name of the second file; write a third file in the update data package into the directory of the to-be-updated file package, herein the third file is a file other than the first file in the update data package; and delete a fifth file in the to-be-updated file package, herein the fifth file is a to-be-deleted file in the to-be-updated file package.

In some embodiments, the apparatus 1300 may further include a fallback unit. The fallback unit is configured to delete the update data package when the verification of the temporary file package fails.

It is to be noted that the units included in the file update apparatus according to the embodiment of the disclosure may be implemented by a processor in an electronic device; of course, they may also be implemented by specific logic circuits. In the process of implementation, the processor may be Central Processing Unit (CPU), Micro Processor Unit (MPU), Digital Signal Processor (DSP), or Field-Programmable Gate Array (FPGA), or the like.

The above description of the apparatus embodiment is similar to the above description of the method embodiment, and has similar beneficial effects as the method embodiment. For technical details not disclosed in the apparatus embodiment of the disclosure, please refer to the description of the method embodiment of the disclosure to understand.

It is to be noted that in the embodiment of the disclosure, if the above file update method is implemented in the form of a software function module and is sold or used as an independent product, the file update method may be stored in a computer-readable storage medium. Based on such understanding, the technical solutions of the embodiments of the disclosure essentially, or the part of the technical solutions that contributes to the related art may be embodied in the form of a software product. The computer software product is stored in a storage medium and includes a number of instructions to enable a computer device (which may be a personal computer, a server, a network device, or the like) to perform all or part of the method described in the embodiments of the disclosure. The storage medium may include a universal serial bus (USB) flash disk, a portable hard disk, a read only memory (ROM), a magnetic disk, an optical disk, or other mediums capable of storing program codes. In this way, the embodiments of the disclosure are not limited to any particular combination of hardware and software.

Accordingly, an embodiment of the disclosure provides an electronic device, i.e., a computer device, including a memory and a processor. The memory stores computer programs executable on the processor, and the processor implements the file update method according to the above embodiment when executing the programs. Here, the electronic device may be a client side or a server side.

Accordingly, an embodiment of the disclosure provides a storage medium, i.e., a computer-readable storage medium, having stored thereon computer programs, and the computer programs implement steps of the file update method according to the above embodiment when executed by a processor.

It is to be noted here that the above description of the storage medium and device embodiment is similar to the above description of the method embodiment, and has similar beneficial effects as the method embodiment. For technical details not disclosed in the storage medium and device embodiment of the disclosure, please refer to the description of the method embodiment of the disclosure to understand.

Figure 14:
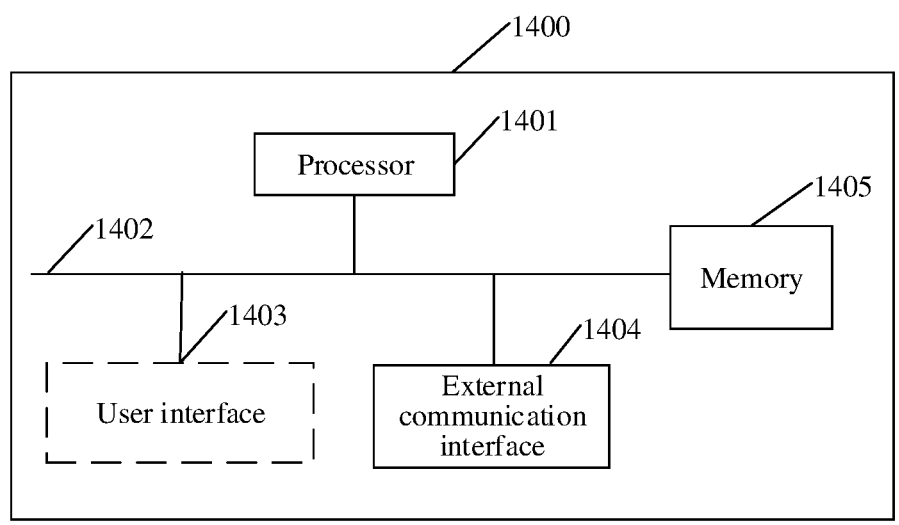
FIG. 14 is an optional schematic structural diagram of an electronic device according to an embodiment of the disclosure.

It is to be noted that FIG. 14 is a schematic diagram of the hardware entity of an electronic device according to an embodiment of the disclosure. As shown in FIG. 14, the electronic device 1400 includes a processor 1401, at least one communication bus 1402, at least one external communication interface 1404, and a memory 1405. Here, the communication bus 1402 is configured to implement connection communication among these components. In one example, the electronic device 1400 further includes a user interface 1403, here, the user interface 1403 may include a display, and the external communication interface 1404 may include a standard wired interface and a wireless interface.

The memory 1405 is configured to store instructions and applications executable by the processor 1401 and may also cache data (e.g., image data, audio data, voice communication data, and video communication data) to be processed or already processed by the processor 1401 and the modules in the electronic device, and the memory may be implemented either by a flash memory (FLASH) or a Random Access Memory (RAM).

It should be understood that references throughout the specification to "one embodiment" or "an embodiment" mean that a particular feature, structure or characteristic associated with the embodiment is included in at least one embodiment of the disclosure. Thus, the words "in an embodiment" or "in some embodiments" appearing throughout the specification do not necessarily refer to the same embodiment. In addition, these particular features, structures or characteristics may be combined in one or more embodiments in any suitable manner. It should be understood that in the various embodiments of the disclosure, the serial numbers of the above processes do not imply the order of execution, and the order of execution of the processes should be determined by their function and inherent logic, and should not constitute any limitation to the implementation processes of the embodiments of the disclosure. The above serial numbers of the embodiments of the disclosure are only for description and do not represent the advantages and disadvantages of the embodiments.

It should be noted that, in the disclosure, the terms "comprising", "including" or any other variations thereof are intended to encompass non-exclusive inclusion, so that a process, method, object or device which includes various elements includes not only those elements but also other elements that are not explicitly listed, or elements inherent in the process, method, object or device. Without further limitations, an element defined by the phrase "including a . . . " does not exclude the existence of another identical element in the process, method, object or device which includes the element.

In some embodiments provided by the disclosure, it may be understood that the disclosed device and method may be implemented in other manners. The device embodiment as described above is only schematic, for example, division of the units is only logic function division, and other division manners may be used during practical implementation. For example, multiple units or components may be combined or integrated into another system, or some features may be ignored or may not be executed. Furthermore, coupling or direct coupling or communication connection between displayed or discussed components may be indirect coupling or communication connection implemented through some interfaces, devices or units, and may be electrical, mechanical or in other forms.

The above units described as separate parts may be or may not be physically separated, and parts displayed as units may be or may not be physical units, namely, may be located in the same place, or may be distributed to multiple network units. Part or all of the units may be selected to achieve the purpose of the solutions in the embodiments according to a practical requirement.

In addition, functional units in each embodiment of the disclosure may be integrated into a processing unit, each unit may also be used as a unit independently, or at least two units may also be integrated into a unit. The above integrated units may be implemented either in form of hardware or in form of hardware and software functional units.

It may be understood by a person of ordinary skill in the art that all or some of the steps to implement the above method embodiment may be completed by hardware related to program instructions, and the aforementioned programs may be stored in a computer-readable storage medium which, when executed, implement the steps including the above method embodiment. The aforementioned storage medium includes: mobile storage device, Read Only Memory (ROM), magnetic disk, CD-ROM, or other mediums capable of storing program codes.

Alternatively, if the above integrated units of the disclosure are implemented in the form of a software function module and are sold or used as an independent product, the file update method may be stored in a computer-readable storage medium. Based on such understanding, the technical solutions of the embodiments of the disclosure essentially, or the part of the technical solutions that contributes to the related art may be embodied in the form of a software product. The computer software product is stored in a storage medium and includes a number of instructions to enable a computer device (which may be a personal computer, a server, a network device, or the like) to perform all or part of the method described in the embodiments of the disclosure. The aforementioned storage medium includes: mobile storage device, ROM, magnetic disk, CD-ROM, or other mediums capable of storing program codes.

The foregoing descriptions are only specific embodiments of the disclosure, but the scope of protection of the disclosure is not limited thereto. Any variation or substitution which may be readily thought by those skilled in the art within the technical scope disclosed in the disclosure should fall within the scope of protection of the disclosure. Therefore, the scope of protection of the disclosure should be subject to the scope of protection of the claims.

The invention claimed is:

1. A file update method, comprising:
    downloading an update data package to a target disk partition where a to-be-updated file package is located, wherein the update data package is used to update the to-be-updated file package;
    obtaining a temporary file package by virtually merging a directory of the to-be-updated file package and a directory of the update data package; and
    merging the update data package into the directory of the to-be-updated file package when verification of the temporary file package succeeds;
    wherein before obtaining the temporary file package by virtually merging the directory of the to-be-updated file package and the directory of the update data package, the method further comprises:
    setting a first upgrade parameter in a bootloader to a first value and generating a primary restart instruction when it is detected that downloading of the update data package is completed, wherein the first value indicates that downloading of the update data package is completed; performing a primary restart based on the primary restart instruction; and correspondingly, obtaining the temporary file package by virtually merging the directory of the to-be-updated file package and the directory of the update data package when it is detected that the first upgrade parameter is the first value.

2. The method of claim 1, wherein downloading the update data package to the target disk partition where the to-be-updated file package is located comprises:
    downloading the update data package to a first space area of the target disk partition, wherein the to-be-updated file package is located in a second space area of the target disk partition.

3. The method of claim 1, wherein obtaining the temporary file package by virtually merging the directory of the to-be-updated file package and the directory of the update data package comprises:
    obtaining a mount directory by virtually merging the directory of the to-be-updated file package and the directory of the update data package; and
    obtaining the temporary file package by calling the to-be-updated file package and the update data package based on the mount directory.

4. The method of claim 3, wherein obtaining the mount directory by virtually merging the directory of the to-be-updated file package and the directory of the update data package comprises:
    adding a path of a first file in the directory of the update data package to the mount directory, wherein the first file has a same name as a second file in the directory of the to-be-updated file package;
    adding a path of a third file in the directory of the update data package to the mount directory, wherein the third file is an added file of the update data package relative to the to-be-updated file package; and
    adding a fourth file in the directory of the to-be-updated file package to the mount directory, wherein the fourth file is a maintained file in the directory of the to-be-updated file package.

5. The method of claim 1, wherein before merging the update data package into the directory of the to-be-updated file package, the method further comprises:
    setting a second upgrade parameter in a bootloader to a second value and generating a secondary restart instruction when it is detected that verification of the temporary file package succeeds, wherein the second value indicates that verification of the temporary file package succeeds;
    performing a secondary restart based on the secondary restart instruction; and
    correspondingly, merging the update data package into the directory of the to-be-updated file package when it is detected that the second upgrade parameter is the second value.

6. The method of claim 1, wherein merging the update data package into the directory of the to-be-updated file package comprises:
- overwriting a second file in the to-be-updated file package with a first file in the update data package, wherein a name of the first file is the same as a name of the second file;
- writing a third file in the update data package into the directory of the to-be-updated file package, wherein the third file is a file other than the first file in the update data package; and
- deleting a fifth file in the to-be-updated file package, wherein the fifth file is a to-be-deleted file in the to-be-updated file package.

7. The method of claim 1, further comprising:
- deleting the update data package when the verification of the temporary file package fails.

8. A computer device, comprising a memory, a processor and a computer program stored in the memory and executable on the processor, wherein the processor is configured to execute the computer program to implement steps of:
- downloading an update data package to a target disk partition where a to-be-updated file package is located, wherein the update data package is used to update the to-be-updated file package;
- obtaining a temporary file package by virtually merging a directory of the to-be-updated file package and a directory of the update data package; and
- merging the update data package into the directory of the to-be-updated file package when verification of the temporary file package succeeds;
- wherein before obtaining the temporary file package by virtually merging the directory of the to-be-updated file package and the directory of the update data package, the processor is configured to execute the computer program to implement steps of:
- setting a first upgrade parameter in a bootloader to a first value and generating a primary restart instruction when it is detected that downloading of the update data package is completed, wherein the first value indicates that downloading of the update data package is completed; performing a primary restart based on the primary restart instruction; and correspondingly, obtaining the temporary file package by virtually merging the directory of the to-be-updated file package and the directory of the update data package when it is detected that the first upgrade parameter is the first value.

9. A non-transitory computer-readable storage medium having stored thereon a computer program that when executed by a processor, implements steps of:
- downloading an update data package to a target disk partition where a to-be-updated file package is located, wherein the update data package is used to update the to-be-updated file package;
- obtaining a temporary file package by virtually merging a directory of the to-be-updated file package and a directory of the update data package; and
- merging the update data package into the directory of the to-be-updated file package when verification of the temporary file package succeeds;
- wherein before obtaining the temporary file package by virtually merging the directory of the to-be-updated file package and the directory of the update data package, the computer program is executed by the processor to implement steps of:
- setting a first upgrade parameter in a bootloader to a first value and generating a primary restart instruction when it is detected that downloading of the update data package is completed, wherein the first value indicates that downloading of the update data package is completed; performing a primary restart based on the primary restart instruction; and correspondingly, obtaining the temporary file package by virtually merging the directory of the to-be-updated file package and the directory of the update data package when it is detected that the first upgrade parameter is the first value.

10. The computer device of claim 8, wherein downloading the update data package to the target disk partition where the to-be-updated file package is located comprises:
- downloading the update data package to a first space area of the target disk partition, wherein the to-be-updated file package is located in a second space area of the target disk partition.

11. The computer device of claim 8, wherein obtaining the temporary file package by virtually merging the directory of the to-be-updated file package and the directory of the update data package comprises:
- obtaining a mount directory by virtually merging the directory of the to-be-updated file package and the directory of the update data package; and
- obtaining the temporary file package by calling the to-be-updated file package and the update data package based on the mount directory.

12. The computer device of claim 11, wherein obtaining the mount directory by virtually merging the directory of the to-be-updated file package and the directory of the update data package comprises:
- adding a path of a first file in the directory of the update data package to the mount directory, wherein the first file has a same name as a second file in the directory of the to-be-updated file package;
- adding a path of a third file in the directory of the update data package to the mount directory, wherein the third file is an added file of the update data package relative to the to-be-updated file package; and
- adding a fourth file in the directory of the to-be-updated file package to the mount directory, wherein the fourth file is a maintained file in the directory of the to-be-updated file package.

13. The computer device of claim 8, wherein before merging the update data package into the directory of the to-be-updated file package, the method further comprises:
- setting a second upgrade parameter in a bootloader to a second value and generating a secondary restart instruction when it is detected that verification of the temporary file package succeeds, wherein the second value indicates that verification of the temporary file package succeeds;
- performing a secondary restart based on the secondary restart instruction; and
- correspondingly, merging the update data package into the directory of the to-be-updated file package when it is detected that the second upgrade parameter is the second value.

14. The computer device of claim 8, wherein merging the update data package into the directory of the to-be-updated file package comprises:
- overwriting a second file in the to-be-updated file package with a first file in the update data package, wherein a name of the first file is the same as a name of the second file;

writing a third file in the update data package into the directory of the to-be-updated file package, wherein the third file is a file other than the first file in the update data package; and deleting a fifth file in the to-be-updated file package, wherein the fifth file is a to-be-deleted file in the to-be-updated file package.

15. The computer device of claim 8, further comprising:
deleting the update data package when the verification of the temporary file package fails.

16. The non-transitory computer-readable storage medium of claim 9, wherein downloading the update data package to the target disk partition where the to-be-updated file package is located comprises:

downloading the update data package to a first space area of the target disk partition, wherein the to-be-updated file package is located in a second space area of the target disk partition.

17. The non-transitory computer-readable storage medium of claim 9, wherein obtaining the temporary file package by virtually merging the directory of the to-be-updated file package and the directory of the update data package comprises:

obtaining a mount directory by virtually merging the directory of the to-be-updated file package and the directory of the update data package; and obtaining the temporary file package by calling the to-be-updated file package and the update data package based on the mount directory.

\* \* \* \* \*